United States Patent [19]
Pointer

[11] 3,793,473
[45] Feb. 19, 1974

[54] INSULATED CONDUCTOR WITH ORGANOMETALLIC STABILIZER

[75] Inventor: Bruce Robert Owen Pointer, Wheathampstead, England

[73] Assignee: Imperial Chemical Industries Limited, London, England

[22] Filed: Nov. 29, 1971

[21] Appl. No.: 202,980

[30] Foreign Application Priority Data
Dec. 1, 1970 Great Britain..................... 57059/70

[52] U.S. Cl................ 174/23 C, 252/63.7, 252/64, 252/404, 252/407, 117/232, 260/45.75 C, 260/45.75 K, 260/45.75 N, 260/45.75 R
[51] Int. Cl......................... H02g 15/20, H01b 3/18
[58] Field of Search ............ 252/63.7, 64, 404, 407; 117/232; 260/45.75 C, 45.75 K, 45.75 N, 45.75 R, 45.95 D; 174/23 C, 23 R

[56] References Cited
UNITED STATES PATENTS
3,660,444   5/1972   Kartschmaroff............. 260/45.75 N OTHER PUBLICATIONS
Geigy, "Irgastab 2002," pp. 1–7, Apr. 6, 1970.

Primary Examiner—Roland E. Martin, Jr.
Attorney, Agent, or Firm—Cushman, Darby and Cushman

[57] ABSTRACT

An electric conductor is insulated with a polyolefine, e.g., polypropylene, containing a phosphorus acid derivative such as nickel bis-(3,5-ditertiary-butyl-4-hydroxy benzyl phosphonic acid monoethylate) and the insulated conductor is immersed in a low molecular weight hydrocarbon such as petroleum jelly.

4 Claims, 1 Drawing Figure

PATENTED FEB 19 1974 3,793,473
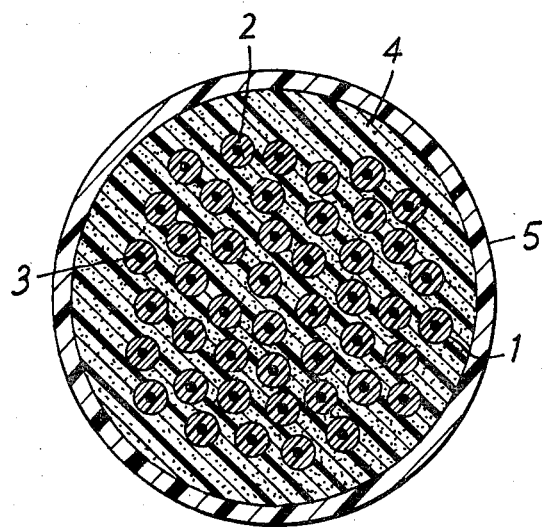

INSULATED CONDUCTOR WITH ORGANOMETALLIC STABILIZER

The present invention relates to the insulation of electrical conductors and in particular to insulated electric conductors which are enclosed in a hydrocarbon jelly.

Telephone distribution wires which are laid underground commonly comprise a plurality of individual insulated conductors which are immersed in petroleum jelly or similar semi-liquid hydrocarbon based material. The petroleum jelly is present to prevent the ingress of water to the conductor in the event of breakdown of the insulation. A widely used material for the insulation is polythene. However, polythene has a low softening temperature which renders it unsuitable for use in a situation where the system is subjected to temperatures of the order of 80°–100°C for a prolonged period of time. Since polypropylene has a much higher softening temperature than polythene it is thus preferable to use polypropylene as the insulation rather than polythene. Furthermore, polythene has a lower resistance to cutting for example by a spade, than polypropylene.

However, it is necessary to incorporate heat stabilisers into the insulation materials if this is to be subjected to prolonged use at an elevated temperature. Many stabilisers presently available are extracted from the polymer by the petroleum jelly and thus the stability of the polymer is decreased by prolonged immersion in the petroleum jelly thereby leading to degradation of the polymer and the associated breakdown of the insulation round the conductor.

According to the present invention there is provided an insulated electrical conductor having an insulating layer formed of an olefine polymer containing a stabilising amount of a phosphorus acid derivative of the formula

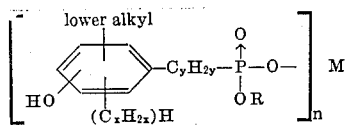

where:

M is a metal cation or complex and has a valency of 1 to 4.

R is an aliphatic, cycloaliphatic or aromatic radical of 1 to 12 carbon atoms;

$x$ is 0 to 6;

$y$ is 1 to 4;

and $n$ is 1 to 4, and is equal to the valency of M.

The cation M may be a metal such as lithium, sodium, potassium, copper, magnesium, calcium, zinc, strontium, cadmium, barium, aluminium, titanium, zirconium, tin, vanadium, antimony, chromium, tungsten, manganese, iron, cobalt and nickel or a complex such as dibutyl-tin and nickel acetate.

The HO— group is preferably situated in the position para to the

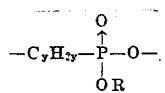

grouping. The R radical is conveniently phenyl or lower alkyl such as ethyl. The lower alkyl group and the group $(C_xH_{2x})H$ are preferably both tertiary alkyl groups such as, for example, tertiary butyl, and are conveniently located in the positions ortho- to the —OH group. The value of $y$ is preferably 1.

A particularly preferred phosphorus acid derivative is nickel bis-(3,5-ditertiarybutyl-4-hydroxybenzyl phosphonic acid monoethylate).

Satisfactory stabilisation of the olefine polymer can be obtained using the phosphorus acid derivative in amounts in the range 0.001 to 5.0 percent by weight based on the total composition. The amount of the phosphorus acid derivative is preferably in the range 0.1 to 1.5 percent, for example about 0.5 percent by weight.

The olefine polymer is conveniently a propylene polymer such as polypropylene but is preferably a copolymer of propylene with ethylene or other α-olefine such as, for example, butene-1. Copolymers of propylene with ethylene have a particularly useful combination of properties including good impact strength and cut resistance.

Thus, as a preferred aspect of the present invention there is provided an insulated electrical conductor having an insulating layer formed of an olefine polymer, preferably a propylene polymer, containing 0.001 to 5.0 percent by weight, based on the total composition of nickel bis-(3,5-ditertiarybutyl-4-hydroxybenzyl phosphonic acid monoethylate).

Insulated electrical conductors in accordance with the present invention are particularly suitable for use in contact with semi-liquid hydrocarbon based materials such as petroleum jelly since the phosphorus acid derivative is not removed from the polymer by petroleum jelly as readily as are many other antioxidants.

Thus, according to a further aspect of the present invention there is provided an electric cable comprising one or more insulated conductors, which are enclosed in a semi-liquid hydrocarbon based material and whereof at least an outer insulating layer of the, or each, insulated conductor is formed of an olefine polymer, preferably a propylene polymer, containing a stabilising amount of a phosphorus acid derivative as hereinbefore defined.

The amount of the phosphorus acid derivative is suitably in the range 0.001 to 5.0 percent by weight, preferably 0.1 to 1.5 percent by weight, of the total polymer composition.

Each insulated conductor may conveniently comprise a single conductor having a single insulating layer, which single layer is formed of an olefine polymer containing a phosphorus acid derivative of the type defined. Cables formed of such insulated conductors are particularly suited for low-voltage applications such as telephone distribution cables. The insulation on the conductor may be solid or foamed.

In addition to the phosphorus acid derivative, polymer forming the insulating material may contain other known additives such as anti-acids, metal degradation inhibitors and also other antioxidants. Typically, using a propylene polymer, it contains a diester of a thiodicarboxylic acid such as the dilauryl or distearyl ester of thiodipropionic acid. The polymer may also contain as a further antioxidant a complex hindered phenolic compound of the type known for the stabilisation of propylene polymers. Such phenolic compounds include tris-(3,5-di-tert-butyl-4-hydroxybenzyl) isocyanurate; pentaerythritol-tetra-[β(3,5-di-tert-butyl-4-hydroxyphenyl)propionate]; 1,1,3-tris-(2'-methyl-5'-tert-butyl-4'-hydroxyphenyl)butane and 1,3,5-trimethyl-2,4,6-tris-[3'5'-di-tert-butyl-4'-hydroxybenzyl]benzene.

A sectional view through an electric cable in accordance with the present invention is illustrated in the accompanying drawing.

The cable is a telephone distribution cable and comprises a plurality of telephone singles 1, each of which comprises a single insulating layer 2 and central conductor 3. The insulating layer 2 is formed of a propylene polymer containing 0.5 percent by wieght of nickel-bis-(3,5-di-tert-butyl-4-hydroxybenzyl phosphonic acid monoethylate) and 0.5 percent by weight of dilauryl thiodipropionate. The singles 1 are immersed in petroleum jelly 4 and this in turn is contained within an outer sheath 5 which may be formed of the same polymer as that forming the insulating layer 2.

A series of experiments were carried out to determine the effect of immersion in petroleum jelly on the oven life of polymer samples containing various stabiliser systems.

Injection moulded plaques containing various stabiliser systems were immersed in petroleum jelly maintained at 80°C for varying periods of time. The plaques were then removed from the petroleum jelly and were cleaned with a cloth to remove excess petroleum jelly from the plaques. The oven lives of the plaques were then determined by ageing in a circulating air oven maintained at 150°C. Ageing of the polymer was assessed by visual examination and embrittlement.

The plaques were prepared by incorporating the stabilisers into the polymer powder to form a powder premix which was then injection moulded at 270°C to form a plaque.

The results obtained are set out in the Table.

F is di-(n-octadecyl)-3,5-di-tert-butyl-4-hydroxybenzyl phosphonate.

A further test was carried out on a plaque made of polypropylene which contained 0.5 percent weight of additive B; 0.5 percent weight of additive D; 0.02 percent weight calcium stearate and 0.25 percent weight of a copper inhibitor which had the formula:

$CH_3-CO-NHNH-CO-C_4H_8-CO-NHNH-CO-CH_3$. After 120 days immersed in petroleum jelly at 180°C the plaque had an oven life at 150°C of 26 days.

A copper wire 0.5 mm in diameter was insulated with a coating 0.2 mm thick of the same polypropylene composition. Satisfactory insulation was obtained.

The phosphoric acid derivatives used in the conductors according to the invention are more fully described in French Patent Specification 1,558,606.

The conductors according to the invention are particularly suitable for use in the constructions described in U.K. Patent Specifications 995,582; 1,095,639; 1,104,450; 1,154,886; 1,175,850.

Processes for making these constructions are described in U.S. Patent Specifications 1,120,011; 1,203,138.

I claim:

1. An electric cable which comprises one or more insulated electrical conductors having an insulating layer formed of an olefine polymer containing as stabiliser from 0.001 percent up to 5 percent by weight based on the polymer of nickel bis-(3,5-ditertiarybutyl-4-hydroxybenzyl phosphonic acid monoethylate), said conductors being enclosed in and in contact with a semi-liquid hydrocarbon based material, said stabiliser being resistant to removal from the olefine polymer by said hydrocarbon based material.

Oven life at 150°C (days) after immersion in petroleum jelly at 80°C for:

| Experiment or Comparative Experiment | Additives and amount (% by wt) | nil | 1 day | 2 days | 4 days | 1 week | 2 weeks | 4 weeks | 2 months | 4 months |
|---|---|---|---|---|---|---|---|---|---|---|
| a | 0.5A+0.5B | 23 | 18 | 21 | 13 | 25 | 13 | 17 | 11 | 11 |
| b | 0.75A+0.75B | 23 | 21 | 31 | 21 | 28 | 20 | 29 | 14 | 17 |
| c | 0.3C+0.75B | 45 | 56 | 63 | 48 | 36 | 29 | 32 | 5 | 4 |
| 1 | 0.5D+0.5B | 25 | 25 | 31 | 31 | 30 | 29 | 51 | <28 | <35 |
| 2 | 0.2C+0.5B +0.5D | 33 | 29 | 38 | 33 | 35 | 31 | 51 | <28 | <35 |
| d | 0.5E+0.5B | 44 | 33 | 34 | 31 | 24 | 20 | 21 | 8 | 4 |
| e | 0.5F+0.5B | 33 | 24 | 29 | 21 | 19 | — | 11 | 3 | — |
| f | 0.2C+0.5B +0.5F | | 41 | 42 | 41 | 30 | 25 | 29 | 9 | |
| g | 0.2C+0.5B | | <35 | <35 | <35 | | | 13 | 8 | |

A is 1,1,3-tris-(2'-methyl-5'-tert-butyl-4'-hydroxyphenyl) butane.
B is dilauryl thiodipropionate.
C is pentaerythritol tetra-[β-(3,5-di-tert-butyl-4-hydroxyphenyl)propionate].
D is nickel bis-(3,5-ditertiarybutyl-4-hydroxybenzyl phosphonic acid monoethylate.
E is tri-(3,5-di-tert-butyl-4-hydroxybenzyl)isocyanurate.

2. A cable according to claim 1, in which the polymer contains 0.1 up to 1.5 percent by weight of the stabiliser.

3. A cable according to claim 1, in which the olefine polymer of which the insulating layer is formed is polypropylene.

4. A cable according to claim 1, in which the olefine polymer also contains 0.01 percent up to 2 percent by weight of the polymer of a copper inhibitor.

* * * * *